United States Patent
Aston et al.

(10) Patent No.: US 7,644,891 B2
(45) Date of Patent: Jan. 12, 2010

(54) SPACECRAFT LOW TUMBLE LINEAR RELEASE SYSTEM

(75) Inventors: Richard W. Aston, Brea, CA (US); Michael Langmack, Huntington Beach, CA (US); Torger J. Totusek, La Palma, CA (US)

(73) Assignee: The Boeing Company, Chicago, IL (US)

( * ) Notice: Subject to any disclaimer, the term of this patent is extended or adjusted under 35 U.S.C. 154(b) by 403 days.

(21) Appl. No.: 11/754,130

(22) Filed: May 25, 2007

(65) Prior Publication Data
US 2008/0290222 A1 Nov. 27, 2008

(51) Int. Cl.
*B64G 1/00* (2006.01)
*B64F 1/04* (2006.01)
*B66C 1/34* (2006.01)

(52) U.S. Cl. .............. 244/173.3; 244/63; 244/137.4; 244/172.4; 294/82.24; 294/82.36

(58) Field of Classification Search .......... 244/63, 244/173.3, 173.2, 173.1, 172.4, 172.5, 137.4; 89/1.58, 1.59, 1.56, 1.54, 1.57; 102/372; 294/82.24, 82.36, 82.26, 82.16; 267/64.12; 188/300

See application file for complete search history.

(56) References Cited

U.S. PATENT DOCUMENTS

| | | | | |
|---|---|---|---|---|
| 4,441,674 A | * | 4/1984 | Holtrop | 244/137.4 |
| 5,755,407 A | * | 5/1998 | Aubret et al. | 244/173.3 |
| 6,126,115 A | * | 10/2000 | Carrier et al. | 244/173.3 |
| 7,083,148 B2 | * | 8/2006 | Bajuyo et al. | 244/137.4 |
| 7,165,745 B2 | * | 1/2007 | McGeer et al. | 244/63 |

* cited by examiner

*Primary Examiner*—Michael R Mansen
*Assistant Examiner*—Joshua J Michener
(74) *Attorney, Agent, or Firm*—Canady & Lortz LLP; Bradley K. Lortz

(57) ABSTRACT

Systems and methods for releasing a spacecraft payload at a substantially constant velocity are disclosed. A linear actuator is used that includes a spring loaded and fluid filled chamber. The spring drives against a piston within the chamber that includes a control orifice that restricts the fluid flowing from one side of the piston to the other and results in a substantially constant damped motion of the piston. The piston drives a rod from the chamber that is attached to a capture device that holds a flange of the spacecraft payload. The capture device moves along a linear guide toward an open end. Spring loaded latches are held in a closed position by the side walls of the guide as the capture device moves. The latches release the flange as exit the open end of the guide.

20 Claims, 6 Drawing Sheets

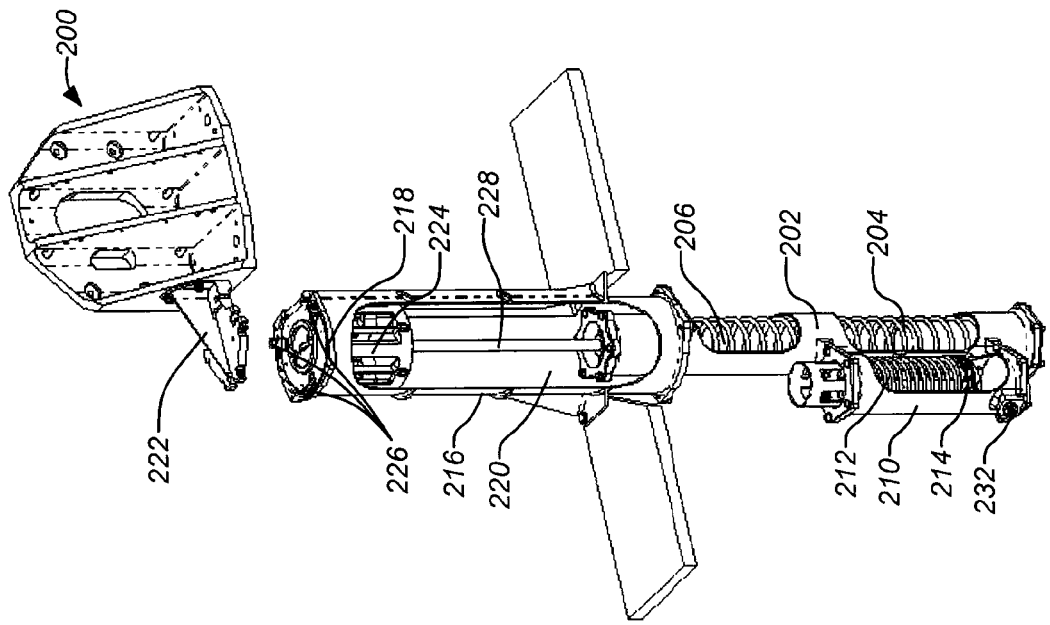
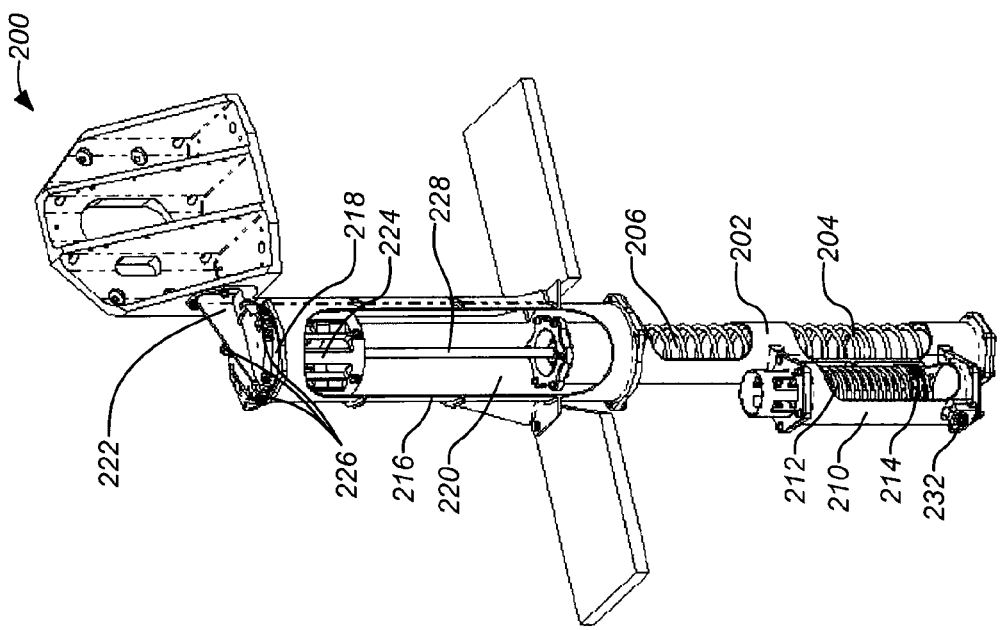
FIG. 2C
FIG. 2D

SPACECRAFT LOW TUMBLE LINEAR RELEASE SYSTEM

GOVERNMENTS RIGHTS STATEMENT

This invention was made with Government support. The government has certain rights in the invention.

BACKGROUND OF THE INVENTION

1. Field of the Invention

This invention relates to mechanisms for spacecraft. Particularly, this invention relates to systems and methods for releasing payloads in space.

2. Description of the Related Art

Separating a major mass item payload from a spacecraft presents a unique problem, particularly if the center of gravity of the payload is not aligned to the separating force vector. Eccentricity of the applied force will impart a rotational motion (or tumble) in addition to the desired linear separating motion which could lead to detrimental recontact of the payload and spacecraft. Other factors can also contribute to undesirable payload tumble.

Spacecraft payloads are often released suddenly by multiple devices that suddenly disengage the payload from the spacecraft at many different points. The release devices are typically explosive and can impart additional energy to the payload in an unpredictable manner. In addition, stored energy in the structure and preloaded joints may also contribute to an unpredictable payload release. Sequenced releases of the multiple devices can sometimes alleviate the problems of an unpredictable payload release. However, there are still many factors that can contribute to payload tumble and it is important to have systems and methods for releasing payloads in a controlled and/or predicatable manner.

Any release system for space applications should also possess other important characteristics. The systems and methods should be very reliable as often failure of a system or mechnism in space affords little or no opportunity for recovery or repair. The entire spacecraft may be lost from a single failed mechnism. In addition, minimizing mass is always an important consideration in space applications. Delivering any object into space is an expensive undertaking and costs generally increase in direct relation to the mass of the spacecraft. In addition, if the mass of supporting systems can be reduced, it allows the payload mass to be increased which can directly affect the mission objective. For example, more mass for the payload may enable a higher power antenna system with better performance. In a related manner, smaller size is also a desirable characteristic for space systems. All spacecraft components must fit within the launch vehicle shroud. It is important that systems are designed that are as compact as possible. Finally, cost of the devices themselves is also a consideration in the design and manufacture of any system for space applications.

In view of the foregoing, there is a need in the art for systems and methods for releasing space payloads in a manner that minimizes forces that may induce undesired rotation or tumble to the payload. Further, there is a need for such systems and method to be simple, reliable, light and compact. There is also a need for such systems and methods to be inexpensive to manufacture and test. As detailed hereafter, these and other needs are met by embodiments of the present invention.

SUMMARY OF THE INVENTION

Systems and methods for releasing a spacecraft payload at a substantially constant velocity are disclosed. A linear actuator is used that includes a spring loaded and fluid filled chamber. The spring drives against a piston within the chamber that includes a control orifice that restricts the fluid flowing from one side of the piston to the other and results in a substantially constant damped motion of the piston. The piston drives a rod from the chamber that is attached to a capture device that holds a flange of the spacecraft payload. The capture device moves along a linear guide toward an open end. Spring loaded latches are held in a closed position by the side walls of the guide as the capture device moves. The latches release the flange as exit the open end of the guide.

A typical embodiment of the invention comprise an apparatus for releasing a payload at a substantially constant velocity including a capture device including one or more latches for holding a flange of the payload and releasing the flange at an end of a linear release path, a linear guide for guiding the capture device along the linear release path, and a damped actuator coupled to the capture device for controlling movement of the capture device and the captured flange of the payload at the substantially constant velocity along the linear release path. The linear guide and the damped actuator may be substantially cylindrical.

In some embodiments of the invention, the linear guide comprises a channel section having a length that carries at least a portion of the flange captured by the one or more latches of the capture device and a slot along the length of the channel section to an open end of the channel section to couple the at least a portion of the flange to the payload. The one or more latches of the capture device may be spring-loaded and held closed over the flange by the channel section until the open end of the channel section is reached. In addition, the one or more spring-loaded latches of the capture device may be disposed in a radial pattern around the periphery of the channel section. Furthermore, the one or more spring-loaded latches of the capture device may each comprise a roller that rolls along an inner wall of the channel section.

In further embodiments of the invention, the damped actuator may comprise a fluid filled chamber and a piston having one or more control orifices that restrict flow of a fluid between a first portion and a second portion of the fluid filled chamber separated by the piston to control movement at the substantially constant velocity. A spring may be compressed against the piston within the chamber to actuate the movement at the substantially constant velocity. In addition, the fluid may comprise a silicon oil.

In other embodiments of the invention, a secondary chamber that is at least partially filled with the fluid and has a passage to the fluid filled chamber may be used. The secondary chamber includes a spring loaded secondary piston to maintain a pressure of the fluid within a specified range. The secondary chamber operates so that the device can tolerate a wider temperature range that would otherwise cause extreme pressures to develop within the actuator if the chamber volume were fixed.

Similarly, a typical method embodiment of the invention for releasing a payload at a substantially constant velocity comprising the steps of holding a flange of the payload with a capture device having one or more latches, guiding the capture device along a linear release path with a linear guide, controlling movement of the capture device and the held flange of the payload at the substantially constant velocity along the linear release path with a damped actuator coupled to the capture device, and releasing the flange at an end of the linear release path. Method embodiments of the invention may be further modified consistent with the apparatuses and systems described herein.

In addition, an apparatus embodiment of the invention may comprise a capture device means for holding a flange of the payload and releasing the flange at the end of a linear release path, a linear guide means for guiding the capture device along the linear release path, and a damped actuator means coupled to the capture device for controlling movement of the capture device and the captured flange of the payload at the substantially constant velocity along the linear release path. This apparatus may also be further modified consistent with the methods and apparatuses described herein.

BRIEF DESCRIPTION OF THE DRAWINGS

Referring now to the drawings in which like reference numbers represent corresponding parts throughout:

FIG. 2C illustrates the release system at the end of the release path with the latches open FIG. 2D illustrates the release system at the end of the release path with the latches open and the flange completely disengaged

DETAILED DESCRIPTION OF THE PREFERRED EMBODIMENT

1. Overview

As previously mentioned, embodiments of the present invention are directed to devices and methods that can release a payload from a spacecraft with a substantially constant velocity to minimize imparting any unwanted rotation to the released payload. Embodiments of the invention can be defined by the cooperative operation of a combination of mechanical elements.

Figure 1A:
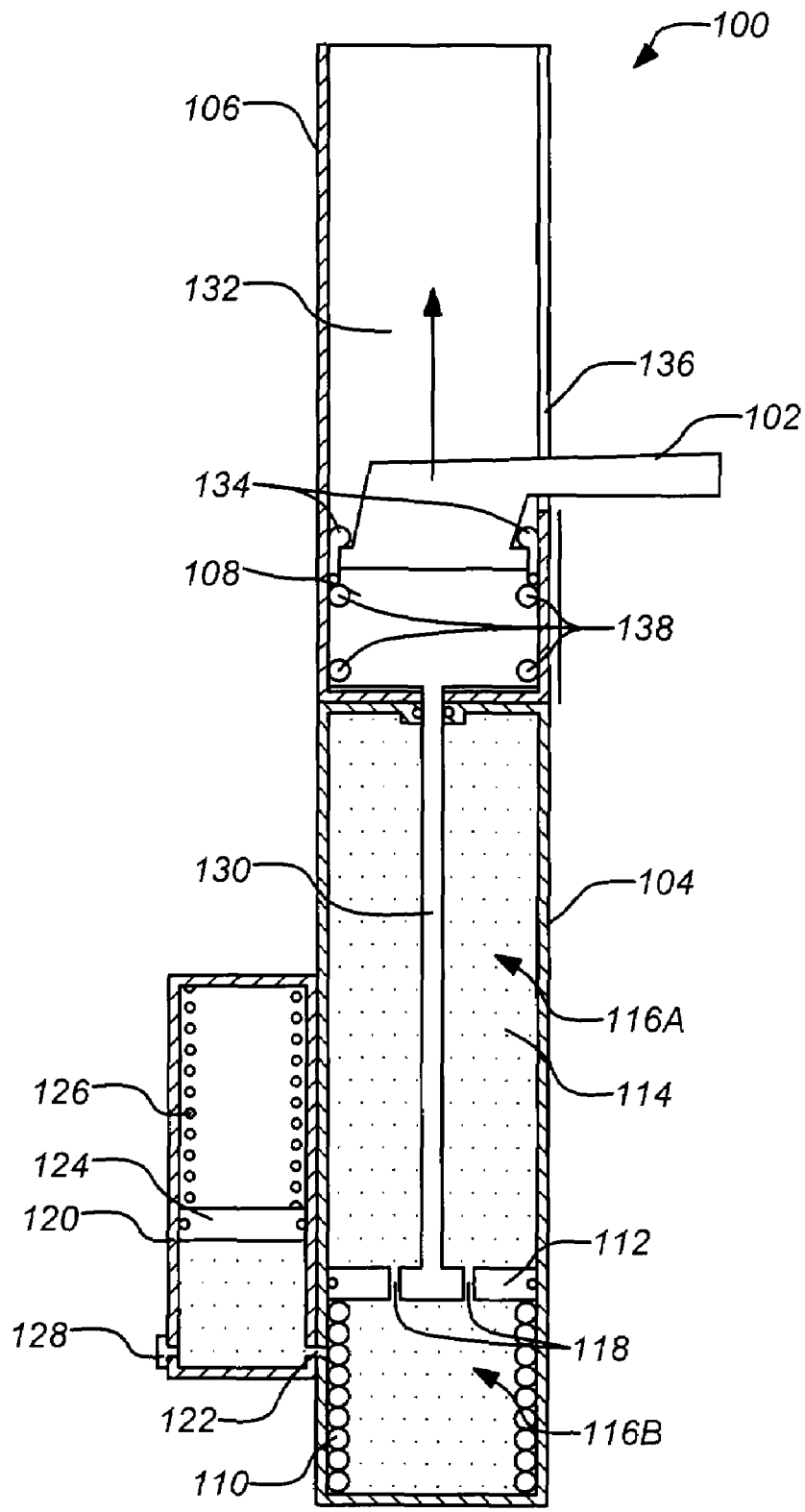
FIGS. 1A and 1B are functional schematic drawings of an exemplary embodiment of the invention.
Figure 1B:
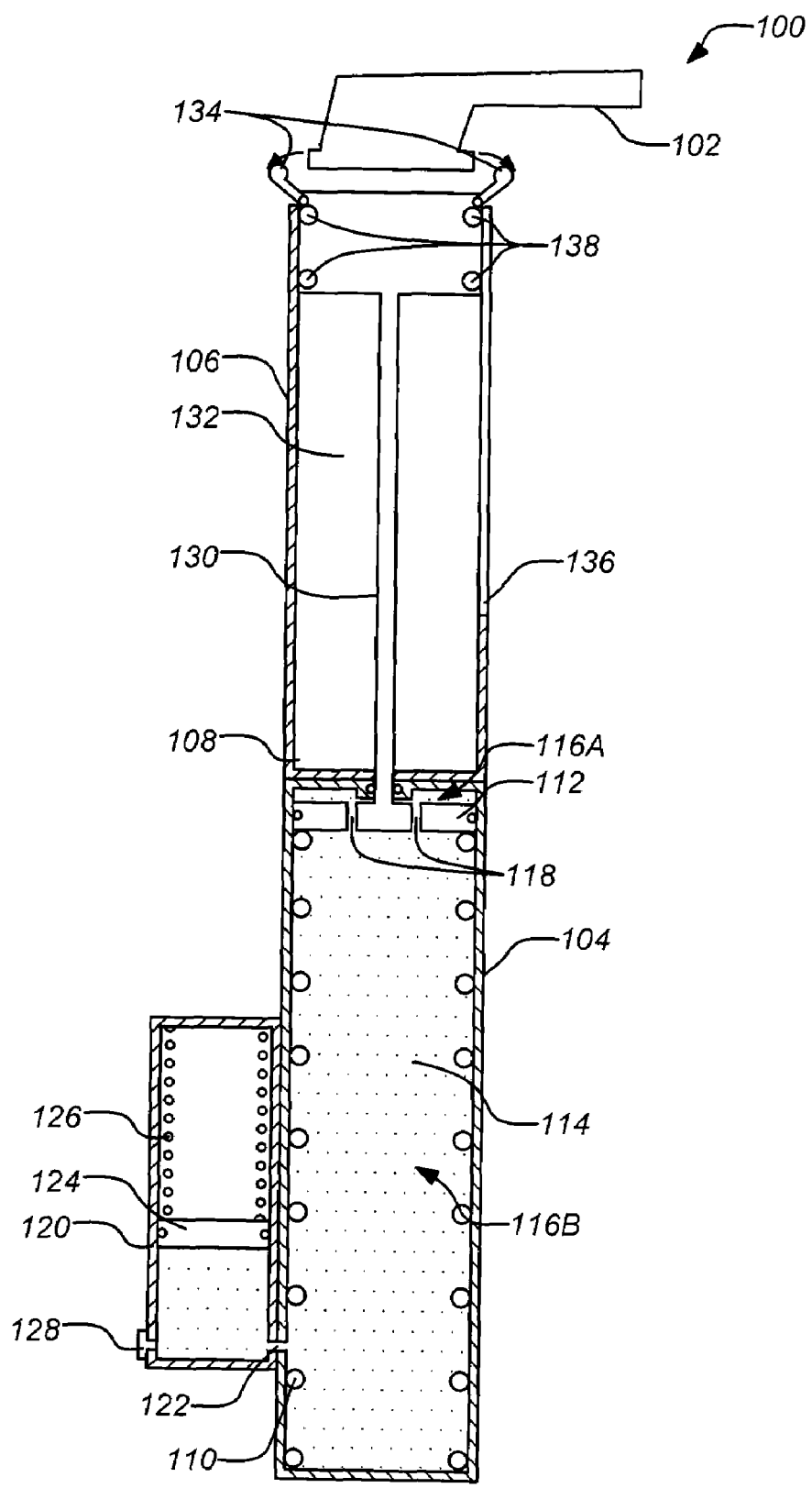

FIGS. 1A and 1B are functional schematic drawings of an exemplary embodiment of the invention. FIG. 1A illustrates a cut away side view of the release system 100 in the start position. The release system 100 operates on a payload that is coupled to a flange 102. After the payload is released, e.g. at preloaded release bolts located elsewhere, the release system 100 begins to operate automatically as a passive system. The two primary components of the system 100 include a damped actuator 104 and a linear guide 106 (that also operates with a capture device 108). The capture device 108 holds the flange 102 of the payload within the linear guide 106. Actuation force is provided by a spring 110 within the damped actuator 104 that is compressed behind a piston 112. The piston 112 is connected by a shaft 130 to the capture device 108 located within the linear guide 106 outside the damped actuator 104. The primary components of the system 100 are typically cylindrical to ease manufacturability. However, any other cross section shape may be developed for one or more of the components without departing from the scope of the invention as will be understood by those skilled in the art.

Damping for actuator 104 is provided by a fluid 114 that fills the chamber occupied by the spring 110 and piston 112. The piston 112 divides the fluid filled chamber into a first chamber portion 116A and a second chamber portion 116B. (The entire chamber may be referenced as 116.) As the spring 110 (located in the second portion 116B) drives the piston 122 to move upward in the direction indicated by the arrow, fluid 114 within the first chamber portion 116A is forced through one or more control orifices 118 through the piston 122 into the second chamber portion 116B. The control orifices 118 are properly sized in cross section (e.g., diameter) and length through the piston 122 in relation to sizing of the spring 110 to set the amount of damping provided to the motion. In turn, the spring 110 and control orifice 118 sizing also sets the substantially constant velocity that will be achieved by the piston 112 as the system 100 operations as will be understood by those skilled in the art.

The system 100 may also employ a secondary chamber 120 to compensate for pressure changes. As the temperature of the system 100 may vary, this may cause the volume of fluid 114 to expand and contract. A rigidly sealed chamber of fluid could develop extreme pressures and possibly rupture under such conditions. To tolerate greater pressure variation (e.g. as caused by temperature variation), the secondary chamber 120 is at least partially filled with fluid and has a passage 122 to the fluid filled chamber 116 (either portion 116A or portion 116B), which may also be referenced as the primary chamber 116 of the damped actuator 104. The secondary chamber 120 includes spring-loaded secondary piston 124 that allows the fluid filled portion of the secondary chamber 120 to expand and contract with volume changes of the fluid 114. The secondary spring 126 may be sized in relation to the area of the secondary piston 124 and the anticipated range of fluid volume (e.g., based upon an anticipated temperature range as will be understood by those skilled in the art.

The fluid 114 used in the system 100 must remain sealed from escaping. The fluid may be an inert viscous liquid with a relatively low coefficient of expansion, such as a silicon oil. However, any other suitable fluid may be used depending upon the desired application. The fluid 114 for the system 100 may be filled through a port 128 located on the exterior of the secondary chamber 120. Alternately a port may be made at any convenient location on the primary chamber 116 or secondary chamber 120. Seals, such as o-ring seals, should be used at any interface that separates the fluid 114 from the environment, particularly moving interfaces. For example, seals should be employed where the shaft 130 exits the chamber 116 and on the secondary piston 124. Seals may also be desirable on the piston 112. However in this case, such seals are only beneficial to help isolate fluid passage to the control orifices 118 (e.g., to facilitate tuning); there is no critical need to prevent leaking between the first portion 116A and second portion 116B of the chamber 116.

The linear guide 106 carries the capture device 108 that secures the payload flange 102 as it is move along a release path from one end of the linear guide 106 to the other during the release process. The capture device 108 has one or more latches 134 that secure the flange 102 to another flange coupled to the shaft 130 of the damped actuator 104. The latches 134 and interface with the flange 102 are sufficient to carry any moment necessary to prevent rotation of the payload. In this way, the system 100 can provide a linear release path even though the system 100 may be located in a position offset from the center of gravity of the payload. The linear guide 106 includes a channel section 132 that guides the capture device 108 and the held flange 102 along its length to an open end. The channel section 132 may include a slot 136 along its length that the flange 102 passes through to the attached payload. Alternately, the flange 102 may be coupled to the payload through the open end of the channel section 132 and the slot 136 may be eliminated.

The latches 134 of the capture device 108 may be spring-loaded and held closed over the flange 102 by the channel section 132 until the open end of the channel section 132 is reached. Typically, the spring-loaded latches 134 may be disposed in a radial pattern around a periphery of the channel section 132. The spring-loaded latches 132 of the capture device 106 may each comprise a roller that rolls along an inner wall of the channel section 132 as the capture device 108 and flange 102 move toward the open end of the channel section 132 during the release.

The capture device 108 may be designed with one or more rollers 138 to facilitate smooth motion down the channel section 132. It may be desirable that only axial forces are transmitted through the release system 100 to the flange 102. Any lateral forces are easily carried by the wall of the linear guide 106 and isolated from the payload. In addition, the capture device 108 may be designed with some length with the rollers 138 at the top and bottom to more easily isolate local moments with the channel section 132 wall (except those about shaft 130) and the slot 136 can isolate local moments about the shaft 130. Thus, any induced moments and torques due to eccentric loading (i.e., offset from the payload center of gravity) can be isolated while permitting only the desired linear, constant rate translation.

FIG. 1B illustrates a cut away side view of the release system 100 in the release position. The capture device 108 and flange 102 within the channel section 132 reach the end of the release path moving at a substantially constant velocity under the damped motion of the actuator 104. As the spring loaded latches 134 exit the open end of the channel section 132, they are free to rotate away from the flange 102 driven by the spring force as shown. Thus, release of the flange 102 is an automatic consequence of reaching the end of the release path. In this manner the flange 102 and coupled payload are released from the spacecraft along a linear path (that may be carried at a location offset from the center of gravity of the payload). The release velocity is steadily maintained by the damped actuator 104 up to the point that the latches 134 release the flange at the end of the release path.

It should also be noted that the release system 100 operates independent from any preloaded release devices which are typically employed with any payload release. As payloads must be secured during a launch, it is usually necessary to use one or more release devices that can support relatively high preloads. The release system 100 operates to control the payload deployment after all preloaded joints for the payload have been released. The damped actuator and the guide length ensure that any unpredictable or uncontrolled disturbances from the release of any high preload release devices (such as explosive devices) have subsided before the latches release.

One advantage afforded by embodiments of the invention is that all of the described functionality is achieved passively. Other conventional systems capable of compensating for highly eccentric deployment forces or would require multiple mechanisms, such as powered motors or pyrotechnic release devices to executed the deployment in sepearate stages. All such conventional solutions are less efficient in terms of mass, power, cost, and system architecture complexity than embodiments of the invention. An exemplary embodiment of the invention is detailed in the next section.

2. Exemplary Low Tumble Release System

FIGS. 2A-2D illustrates different phases in the operation of an exemplary embodiment of the invention. This exemplary embodiment may be described as two primary components that operate together, an "energy unit" (i.e., the damped actuator) comprising a high force deployment spring in an oil filled chamber and a guide device which operates in conjunction with a capture device to hold, move and release a flange of the spacecraft payload. It should be noted that the views of FIGS. 2A-2D show components with cutouts in their cylindrical walls to better illustrate the internal components of the device but which would not exist on the physical implementation as will be understood by those skilled in the art.

Figure 2A:
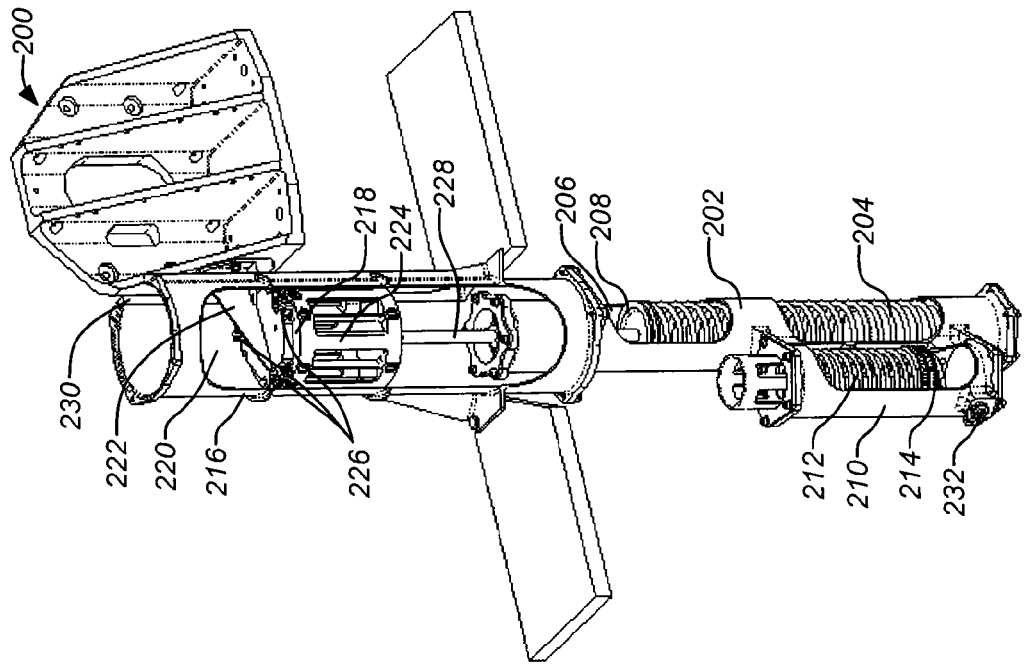
FIG. 2A illustrates the system in a start position before initiation of the release.

FIG. 2A illustrates the system 200 in a start position before initiation of the release. The actuator 202 employs a high force deployment spring 204 within a chamber 206 that is filled with an oil damping fluid. The spring 204 exerts its force upon a piston 208 which has small control orifices which allow the fluid to pass from one side of the piston 208 to the other in order to control the rate of travel. The system 200 assumes a substantially constant velocity within a few milliseconds of actuation. The acutator 202 then continues to advance at the substantially constant velocity for the desired travel length which corresponds to a release time. Depending upon the application, the release time can be critical and can be controlled by tuning the size of the one or more orifices to adjust the release time. This may be desired, for example, in the event that the deployed payload has local modes of vibration that may need time to dampen.

The acutator 202 also employs an secondary accumulator chamber 210 with a passage to the chamber 206 to compensate for pressure changes, e.g., induced by thermal expansion of the damping fluid. The secondary chamber 210 includes a spring 212 that pushes against a piston 214 applying an acceptable pressure range to the fluid based on the predicted fluid expansion over the anticipated environmental temperature range. The secondary chamber 210 also incorporates a port 232 for filling the actuator 202 and secondary chamber 206 with fluid.

The second component of the system 200 comprises the guide device 216 which operates in conjunction with a capture device 218. This component includes a channel section 220 (or guide tube) that guides the capture device 218 and the coupled flange 222 of the spacecraft payload. The capture device 218 employs a roller assembly 224 and three passive restraint latches 226. The actuator 202 provides an output shaft 228 that interfaces with the roller assembly 224 of the capture device 218. The attachment is arranged so that only axial forces are transmitted through the release system 200 to the flange 222. All other lateral forces and local moments are isolated via local slotting of interface holes and a spherical bearing. Under the force of the actuator 202, the roller assembly 224 translates along the channel section 220. Two rings of roller elements on the outside diameter of the roller assembly 224 plus rolling elements along the guide tube slot 230 react eccentricity induced moments and torques while permitting only the desired linear, constant rate translation.

Figure 2B:
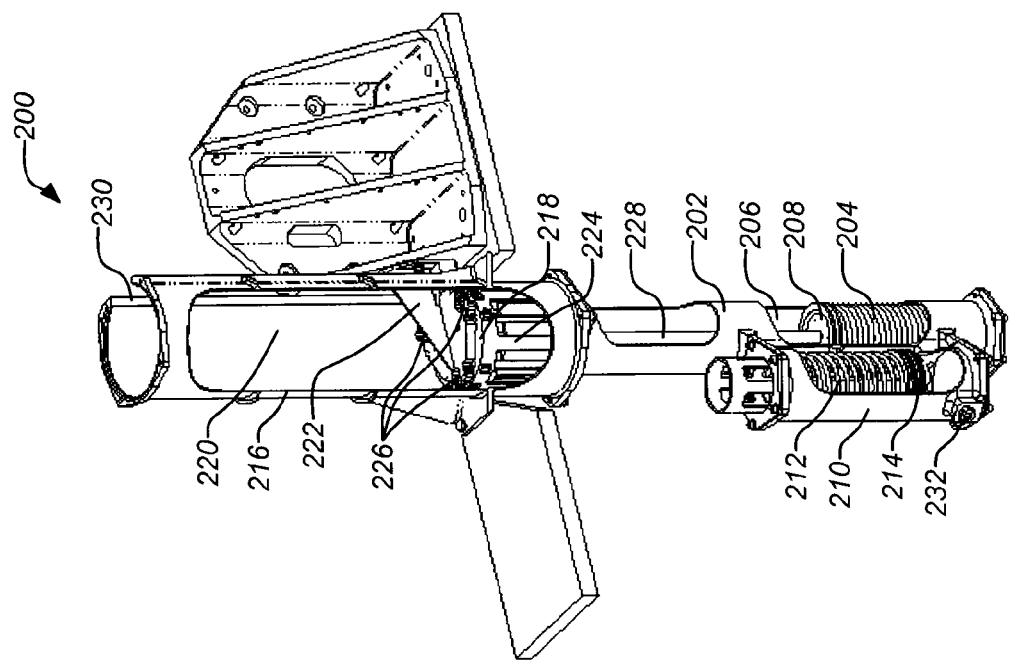
FIG. 2B illustrates the release system at a midpoint of the release path.

FIG. 2B illustrates the release system 200 at a midpoint of the release path. At this midpoint it can be seen that the actuator 200 appears to extend into the region of the channel section 220 in the example system 200. In the stowed position (in FIG. 2A) a portion of the roller assembly 224 extends down around the end of the actuator 200. As previously discussed, the length of the roller assembly (as part of the capture device 218) assists in isolating moments across the interface.

FIG. 2C illustrates the release system 200 at the end of the release path with the latches 226 open. The capture device 218 is designed so that the three capture latches 226 disengage the flange 222 at the end of the release path. These latches 226 provide restraint throughout the release path travel by contacting the inside diameter wall of the channel section 220. At the end of the release path, each of the restraint latches 226 are passively deployed by a torsion spring allowing the payload to separate from the release system 200. Separation then commences in response to the linear momentum of the payload. All lateral motions and moments are minimized by the release system with only the linear motion being permitted even though the center of mass of the payload may be highly eccentric to the line of action of the applied spring force of the release system. FIG. 2D illustrates the release system 200 at the end of the release path with the latches 226 open and the flange 222 completely disengaged.

Figure 3A:
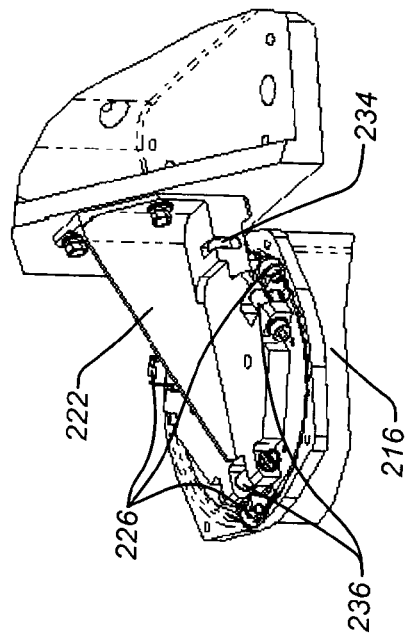
FIGS. 3A-3C illustrates release of the capture device in an exemplary embodiment of the invention.
Figure 3C:
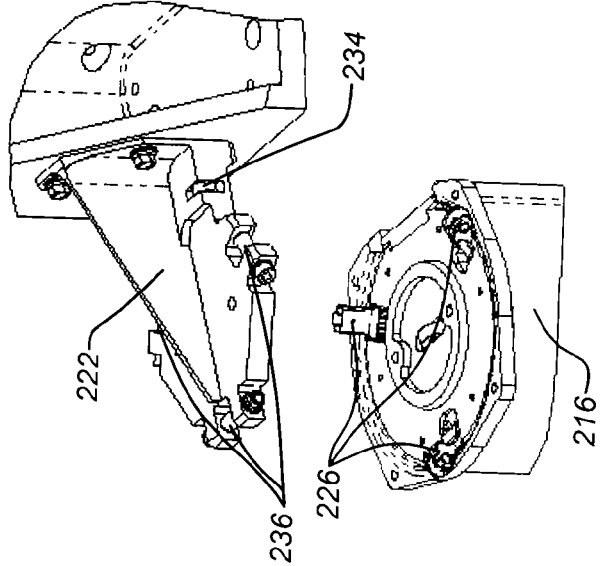
Figure 3B:
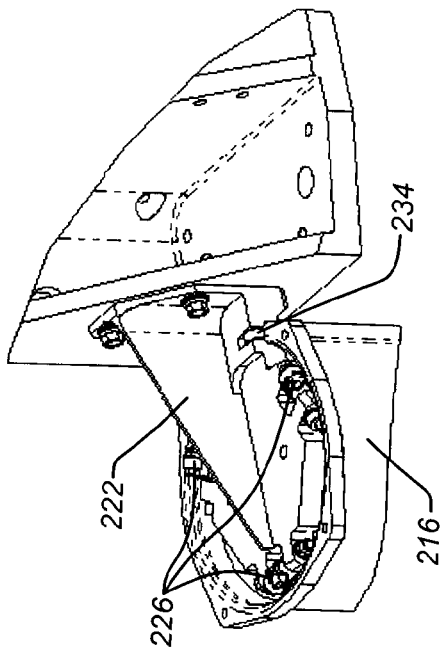

FIGS. 3A-3C illustrates in detail release of flange from the capture device in an exemplary embodiment of the invention. FIG. 3A illustrates the capture device 218 at the end of the channel section 220 of the guide device 216 as the latches 226 are opening. In this view, additional slot rollers 234 that support lateral loads on the flange 222 against the slot 230 (particularly those about the vertical) can also be seen. FIG. 3B illustrates the capture device 218 at the end of the channel section 220 of the guide device 216 with the latches 226 fully open. It can be seen that when engaged each of the latches 226 are secured over a pin 236 on the flange 222. FIG. 3C illustrates the capture device 218 with the latches 226 fully open and the flange 222 separated from the release system 200.

The release system may be produced from standard aerospace materials. For example, housings and components may be machined from aluminum alloys and other lightweight aerospace metals. Titanium and/or steel fasteners and bearings are also typically used. The fluid may be a silicon fluid or any other suitable inert fluid that will yield proper damping through properly sized control orifices. It should also be noted that the features of the described embodiment of the invention are scalable. That is, the same underlying principles of force, guidance, and release may be implemented on much smaller or larger systems as will be understood by those skilled in the art.

3. Method of Releasing a Payload

Embodiments of the invention also encompass a method of releasing a payload at a substantially constant velocity. The method of releasing a payload may be applied to many different forms of hardware such as the exemplary embodiment illustrated in FIGS. 2A-2D.

Figure 4:
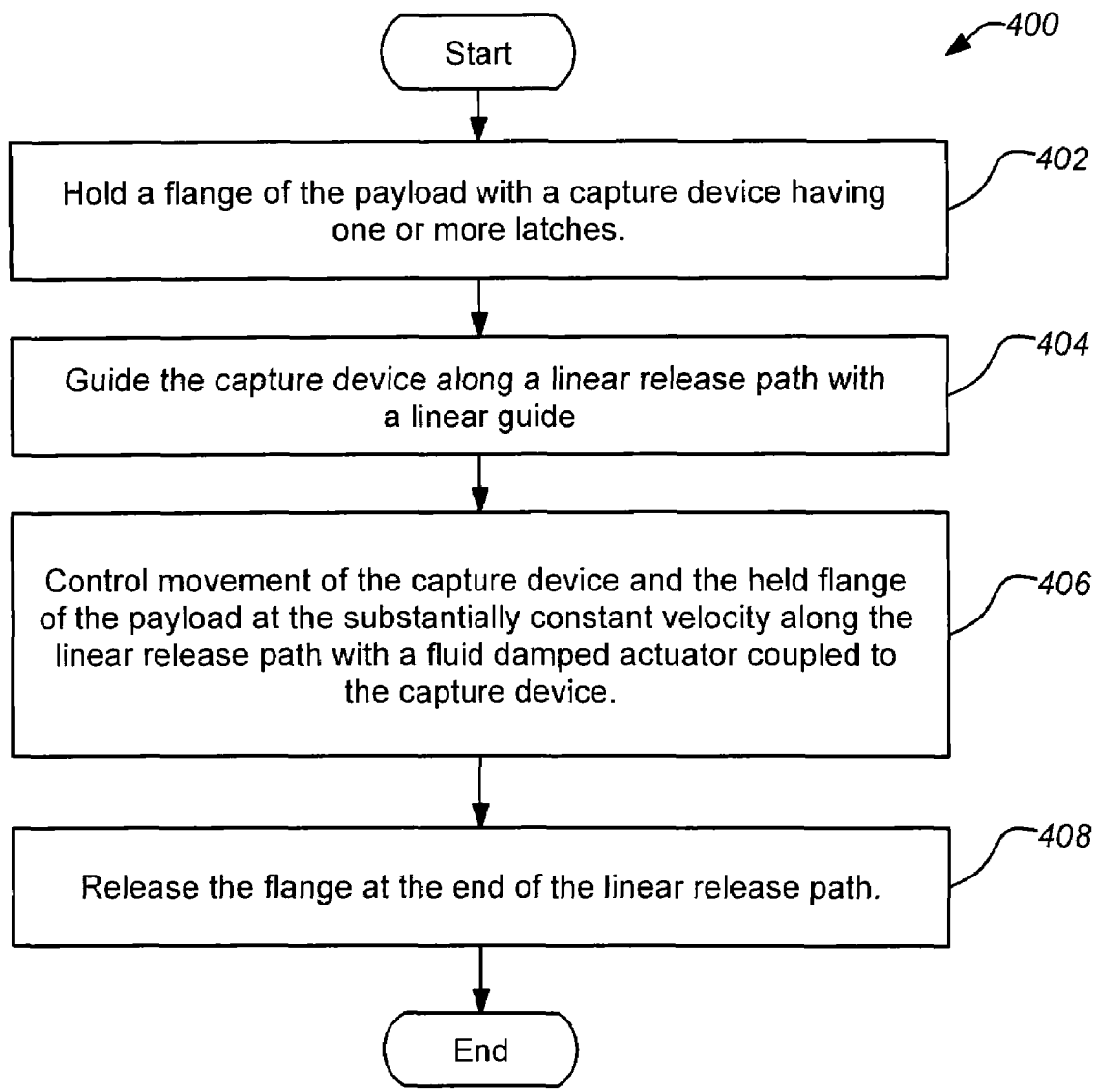
FIG. 4 is a flowchart of an exemplary method for releasing a payload at a substantially constant velocity.

FIG. 4 is a flowchart of an exemplary method 400 for releasing a payload at a substantially constant velocity. The method 400 begins with an operation 402 of holding a flange of the payload with a capture device having one or more latches. Next in operation 404, the capture device is guided along a linear release path with a linear guide. In operation 406, movement of the capture device and the held flange of the payload are controlled at the substantially constant velocity along the linear release path with a fluid damped actuator coupled to the capture device. Finally in operation 408, the flange is released at the end of the linear release path.

The method 400 may be further modified consistent with any of the apparatus embodiments previously described. For example, the movement at the substantially constant velocity may be actuated with a spring compressed against a piston within the chamber having one or more control orifices that restrict flow of a fluid between a first portion and a second portion of the fluid filled chamber separated by the piston. In addition, the pressure of the fluid may be maintained within a specified range using a secondary chamber including a spring loaded secondary piston where the secondary chamber is at least partially filled with the fluid and has a passage to the fluid filled chamber.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A spacecraft comprising an apparatus for releasing a payload at a substantially constant velocity comprising:
   a capture device including one or more latches for holding a flange of the payload and releasing the flange at an end of a linear release path;
   a linear guide for guiding the capture device along the linear release path; wherein the linear guide comprises a channel section having a length that carries at least a portion of the flange captured by the one or more latches of the capture device and a slot along the length of the channel section to an open end of the channel section; and
   a damped actuator coupled to the capture device for controlling movement of the capture device and the captured flange of the payload at the substantially constant velocity along the linear release path.

2. The apparatus of claim 1, wherein the linear guide and the damped actuator are substantially cylindrical.

3. The apparatus of claim 1, wherein the one or more latches of the capture device are spring-loaded and held closed over the flange by the channel section until the open end of the channel section is reached.

4. The apparatus of claim 3, wherein the one or more spring-loaded latches of the capture device are disposed in a radial pattern around a periphery of the channel section.

5. The apparatus of claim 3, wherein the one or more spring-loaded latches of the capture device each comprise a roller that rolls along an inner wall of the channel section.

6. The apparatus of claim 1, wherein the damped actuator comprises a fluid filled chamber and a piston having one or more control orifices that restrict flow of a fluid between a first portion and a second portion of the fluid filled chamber separated by the piston to control movement at the substantially constant velocity.

7. The apparatus of claim 6, further comprising a spring compressed against the piston within the chamber to actuate the movement at the substantially constant velocity.

8. The apparatus of claim 6, wherein the fluid comprises silicon oil.

9. The apparatus of claim 6, further comprising a secondary chamber that is at least partially filled with the fluid and has a passage to the fluid filled chamber, the secondary chamber including a spring loaded secondary piston to maintain a pressure of the fluid within a specified range.

10. A spacecraft comprising an apparatus for releasing a payload at a substantially constant velocity comprising:
    a capture device means for holding a flange of the payload and releasing the flange at the end of a linear release path;
    a linear guide means for guiding the capture device along the linear release path; wherein the linear guide means comprises a channel section having a length that carries at least a portion of the flange captured by the capture device means and a slot along the length of the channel section to an open end of the channel section; and a damped actuator means coupled to the capture device for controlling movement of the capture device and the captured flange of the payload at the substantially constant velocity along the linear release path.

11. The apparatus of claim 10, wherein the capture device means comprises one or more latches that are spring-loaded and held closed over the flange by the channel section until the open end of the channel section is reached.

12. A method for releasing a payload at a substantially constant velocity from a spacecraft comprising the steps of:

holding a flange of the payload with a capture device having one or more latches;

guiding the capture device along a linear release path with a linear guide; wherein the linear guide comprises a channel section having a length that carries at least a portion of the flange captured by the one or more latches of the capture device and a slot along the length of the channel section;

controlling movement of the capture device and the held flange of the payload at the substantially constant velocity along the linear release path with a damped actuator coupled to the capture device; and releasing the flange at an end of the linear release path.

13. The method of claim 12, wherein the linear guide and the damped actuator are substantially cylindrical.

14. The method of claim 12, wherein the one or more latches of the capture device are spring-loaded and held closed over the flange by the channel section until the open end of the channel section is reached.

15. The method of claim 14, wherein the one or more spring-loaded latches of the capture device are disposed in a radial pattern around a periphery of the channel section.

16. The method of claim 14, further comprising rolling a roller attached to each of the one or more spring-loaded latches of the capture device along an inner wall of the channel section.

17. The method of claim 12, wherein the movement is controlled at the substantially constant velocity with the damped actuator having a fluid filled chamber and a piston having one or more control orifices that restrict flow of a fluid between a first portion and a second portion of the fluid filled chamber separated by the piston.

18. The method of claim 17, further comprising actuating the movement at the substantially constant velocity with a spring compressed against the piston within the chamber.

19. The method of claim 17, wherein the fluid comprises silicon oil.

20. The method of claim 17, further comprising maintaining a pressure of the fluid within a specified range using a secondary chamber including a spring loaded secondary piston where the secondary chamber is at least partially filled with the fluid and has a passage to the fluid filled chamber.

* * * * *